Oct. 11, 1966 H. C. ZIMMERMAN 3,277,590
TEACHING SYSTEM APPARATUS
Filed March 10, 1964 2 Sheets-Sheet 2

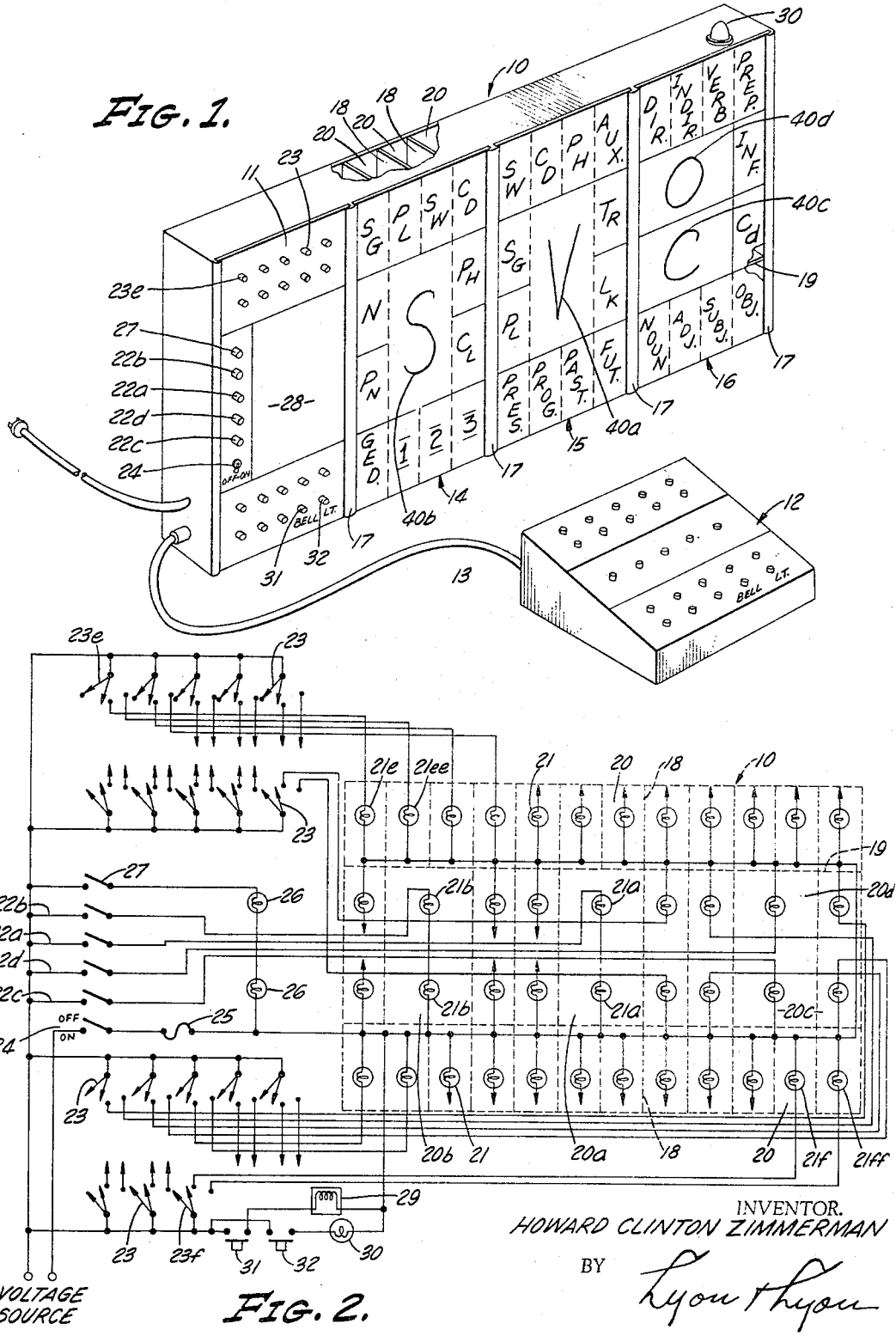

INVENTOR.
HOWARD CLINTON ZIMMERMAN
BY *Lyon+Lyon*
ATTORNEYS

United States Patent Office 3,277,590
Patented Oct. 11, 1966

3,277,590
TEACHING SYSTEM APPARATUS
Howard Clinton Zimmerman, 816 Archie St.,
Eugene, Oreg.
Filed Mar. 10, 1964, Ser. No. 350,844
7 Claims. (Cl. 35—35)

This invention relates to a teaching system and, in particular, is directed to a versatile teaching system apparatus for visual assistance and emphasis in the teaching of matters related to educational subjects and particularly language.

There are many well accepted and highly desirable principles and theories of education of both recent and ancient vintage for the improvement of learning. However, while the advantages of such principles may be well recognized, the methods and tools for implementing these principles are often inadequate and archaic. For example, the desirability of visual emphasis of orally reported material (or vice versa) is well accepted and yet the methods and implements presently available to the student and educator are limited to such means as blackboards or pre-prepared charts and pictures which lack versatility and flexibility. Another example is the acknowledged preference for student learning by way of construction and induction rather than dissection for analysis. Further, many methods and implements permit teaching in only a single manner which may not generate learning in certain students, whereas an ability to immediately reverse or modify this manner of instruction may generate such learning.

Accordingly, it is an object of this invention to provide a novel form of teaching system apparatus wherein a particular area of instructional material is placed in logical divisions and represented on the apparatus with limitations, relationships, characteristics, etc. of such division also represented on the apparatus and lighting means are provided for individually emphasizing any and all such divisions, limitations, relationships, characteristics, etc.

Another object of this invention is to provide a flexible and versatile teaching system apparatus having a multiplicity of individually controlled lights which individually illuminate separate indicia on removable and replaceable panels with such indicia logically organized for representing a preselected area of instructional material.

A further object of this invention is to provide a novel teaching system apparatus wherein a plurality of panels concerned with a given subject matter each have legends thereon concerned with a particular subdivision of such subject matter and the individual legends may be visually emphasized by controlling lighting means provided with the apparatus. Still a further object of this invention is to provide such an apparatus wherein such panels are positioned side-by-side from left to right in the logical left to right order of their consideration with respect to that subject matter.

Still another object of this invention is to provide a novel teaching system apparatus employing individually back-lighted indicia as abbreviations of limitations and/or relationships to language statements, whereby symbolic formulas of such statements may be created for eliciting an appropriate statement as a student response or for student creation of a symbolic statement for a given language statement.

Another and more detailed object of this invention is to provide a teaching system apparatus with back-lighted symbolic indicia representing various limitations, relationships, characteristics, etc. concerning language relationships, wherein any given limitations, etc., which are mutually exclusive or contradictory are represented adjacent one another for provoking a binary decision between same by the student.

Other and more detailed objects and advantages of this invention will appear from the following description and the accompanying drawings, wherein:

FIGURE 1 is a perspective view of the apparatus of this invention and illustrating panels associated with the teaching of a given subject matter.

FIGURE 2 is a schematic wiring diagram of the apparatus of this invention with certain of the wires illustrated as discontinuous for clarity of the entire illustration.

FIGURES 3, 4 and 5 are elevation views of three separate modified forms of the panels of the teaching system apparatus of this invention for use in teaching three separate subject matter areas.

Referring now more particularly to FIGURES 1 and 2, the apparatus of this invention includes a housing, generally designated 10, which is provided with a control panel 11 on one end. In addition, to control panel 11 or as a substitute therefor, a control console 12 may be provided and connected to the apparatus within housing 10 by means of electrical cable 13 for remote operation of the electrical means within housing 10. Further, additional consoles, similar to console 12, may be provided for individual operation of the apparatus by a number of students if such be the desired programme of instruction. Console 12 and such other consoles are connected in parallel with and perform the same functions as the means of control panel 11 and, therefore, it is deemed necessary that only the means of control panel 11 need be described in detail for a complete understanding of the function and operation of console 12.

The front of housing 10 is provided with appropriate means for removably receiving a plurality of instructional panels, generally designated 14, 15 and 16, and as shown in the drawings, these means may include laterally spaced parallel guide rails 17 on the front of the housing. In this manner, the flat instructional panels 14, 15 and 16 may be removed and refitted by mere vertical movement of the panels.

In the area of instructional panels 14, 15 and 16, the housing 10 is provided with means for illuminating individual areas of the instructional panels and, as shown in drawings, these means may include a plurality of cooperating vertical walls 18 and horizontal walls 19 forming separate cells 20. The cells 20 are arranged in the predetermined pattern which has been found to be of the greatest versatility, flexibility and effectiveness. The many reasons and advantages obtained by this particular cell pattern will hereinafter appear more fully in connection with the description of the instructional panels 14, 15 and 16, and the modifications thereof. A light bulb 21 is mounted in each of the cells 20 and in certain of the larger cells, such as cell 20a, a pair of light bulbs 21a are provided for commensurate illumination of that larger cell. As will appear hereinafter more fully, the instructional panels 14, 15 and 16 are provided with various separated indicia thereon which is arranged in the predetermined pattern of the cells 20 or at least a portion of those cells for permitting selective illumination of such indicia by the light bulbs 21. The control panel 11 is provided with switches for separately energizing each of the light bulbs 21 except that those light bulbs which are paired in a single cell 20 and need not be separately controllable. The larger and centrally located cells 20a, 20b, 20c and 20d serve to illuminate indicia on the instructional panels which identifies a major division of the subject matter (as will hereinafter appear more fully) and, therefore, it is preferred that the light bulbs in these four cells be operated by four separate switches 22a, 22b, 22c and 22d grouped in a preselected area of the control panel as shown in the drawings. The remaining light bulbs 21 positioned in cells 20 are grouped around cells 20a–20d. These light bulbs will serve to illuminate indicia on the instructional panels which represent limitations, relationships, characteristics, etc., of the major divisions, some of which will be pairs of generally mutually exclusive limitations, relationships, characteristics, etc., such as for example "singular" or "plural." Thus, while it is not essential to this invention it is preferred that the remaining thirty-six light bulbs 21 be operated by eighteen double pole switches 23 with each switch operating two lights. Switches 23 are of the four position type as follows: Both bulbs off, both bulbs on, only one bulb on, and only the other bulb on. The two bulbs operated by a given switch 23 are positioned in adjacent, either horizontally or vertically, cells which are in turn adjacent one of the aforedescribed cells 20a–20d. Wherever possible, the indicia on the instructional panels is arranged whereby the aforementioned mutually exclusive limitations, relationships, characteristics, etc., are illuminated by two bulbs controlled by a single switch 23 for further emphasizing this mutual exclusivity.

In the conventional manner, the control panel 11 is supplied with electrical current from a voltage source through on off-on switch 24 which is connected in series with a fuse 25. A pair of light bulbs 26 operated by a switch 27 may be positioned in the control panel portion 11 for illuminating a small panel 28 which may bear any desired identification and directional material relating to the apparatus. A bell 29 and a light 30 are provided and operated by switches 31 and 32, respectively. Bell 29 and light 30 may be used for any convenient purpose, but it is specifically contemplated that the device will be used selectively to indicate accurate or erroneous student responses during use of the apparatus. While the apparatus has been described as comprised of light bulbs positioned in individual cells and operated by specific types of switches, numerous substitutions and modifications which do not depart from this invention will readily appear to those skilled in the art. For example, it is specifically contemplated that automatic control means may be provided for operating or in substitution for the various described switches in response to the insertion of a cooperating and pre-programmed card, tape, or the like.

The instructional panels 14, 15 and 16 as well as the like panels in the modified forms of FIGURES 3, 4 and 5, may be of any convenient material and construction whereby the indicia thereon is illuminated and visually emphasized by the illumination of a bulb 21 behind the indicia. For example, the structural panels may of a translucent material with opaque lettering of the indicia or translucent lettering of a different colour than the translucent background formed by the panel. Further, it is specifically contemplated that for purposes of visual emphasis of the logical division and subdivision of the subject matter that the lettering of the indicia or legends representing the major divisions be of a given colour while the legends and indicia surrounding these be of different colours which in turn correspond to logical groupings thereof.

Referring particularly to FIGURE 1, the instructional panels 14, 15 and 16 exhibit indicia relating to English language syntax and the teaching thereof. The four basal parts of English syntax are the subject, the verb, the object, and the complement, and in this regard panel 14 relates to the subject, panel 15 relates to the verb, and panel 16 is divided into upper and lower halves relating to the object and the complement, respectively. The indicium "S" 40b in the middle of panel 14 is symbolically representative of the "Subject" and is positioned directly over cell 20b for being illuminated by the two light bulbs 21b. Similarly, the large "V" indicium 40a, the large "C" indicium 40c and the large "O" indicium 40d, symbolically represent "Verb," "Complement," and "Object," respectively. The basal part "Subject" of English syntax is thus represented by instructional panel 14 and the symbolic indicium "S" is surrounded logically by symbols, legends or indicia representing its major modifying limitations, relationships, or characteristics as used in English statements. While the full title or designation could be used rather than these symbolic abbreviations, the symbols are preferred for permitting the representation of English statements by way of symbolic "formulas" for simple and rapid instruction. The symbolic indicia relating to the "Subject" on panel 14 represent the following characteristics: N equals noun; Pn equals pronoun; Ph equals phrase; Cl equals clause; Sg equals singular number; Pl equals plural number; SW equals single word; Cd equals compound; Ged equals gerund; $\bar{1}$ equals first person; $\bar{2}$ equals second person; and $\bar{3}$ equals third person. Similarly, the symbolic indicia surrounding group "V" on the verb instructional panel 15 represent the following: Sg equals singular number; Pl equals plural number; Tr equals transitive; Lk equals linking; SW equals single word; Cd equals compound; Ph equals phrasal; Aux equals auxiliary; Pres. equals present tense; Prog. equals progressive tense; Past equals past tense; and Fut. equals future tense. Since instructional panel 16 is horizontally divided into upper and lower halves, the symbolic indicia surrounding "O," the "Object" basal part, in the upper half, are as follows: Dir. equals direct; Indr. equals indirect; Verb equals of the verb; Prep. equals of the preposition; and Inf. equals of the infinitive, while the symbolic indicia surrounding "C" relate to the "Complement" as follows: Noun equals noun; Adj. equals adjective; Subj. equals of the subject; Obj. equals of the object; and Cd equals compound.

As thus arranged, it may be observed from the foregoing description that any one or more of the foregoing indicia may be illuminated by operating the proper switches 22 and 23. Further, as previously mentioned, each pair of mutually exclusive or binarily incompatible characteristics of a given basal part is positioned together and operated by the same switch 23. For example, the "Subject" of an English statement is not usually both singular and plural and thus switch 23e serves to operate bulbs 21e and 21ee positioned in the cells 20 behind the indicia Sg and Pl, respectively. Similarly, in the major or primary division of "Complement," the light bulbs 21f and 21ff behind the legends "SUBJ" and "OBJ," are operated by a single switch 23f. Many other pairings are readily observable and their cataloging is believed unnecessary to a complete understanding of this invention.

Although there are probably innumerable procedural manners in which this teaching system apparatus may be employed in teaching a given subject matter, there are at least three basic procedural manners contemplated. One manner of use would be to present the student with an English statement or sentence "formula" by appropriately illuminating the apparatus and to elicit a written or oral response commensurate with that formula. This formula may be exhibited in its entirety or in progressive logical sequence to elicit student responses appropriate to the formula as it progressively develops. As for example, the indicium 40b, the large "S," would be illuminated to focus the student's attention upon the subject portion of the instructional material, then the "N" or noun indicium might be illuminated to require that the subject of the English statement be a noun. Next, the "Sg" indicium might be illuminated to further require the student to limit his selection to a subject of single number. Further, with the foregoing indicia still illuminated, the "SW" or single word symbol might be illuminated to indicate that the subject must also be a single word and, therefore, a proper response by the student could be "TOM." Similarly, the student's attention would then be directed to instructional panel 15 by illuminating the large "V" or verb symbol and in turn progressively illuminating such indicia as "Lk" for linking, "Sg" for single number, "Pres." for present tense, and "SW" for single word thereby permitting a correct response of "IS." Further, the large "C" might be illuminated together with "Adj." and "Subj." thereby permitting a total and accurate response to the formula as follows: "TOM IS TALL."

A second procedural manner for using the system apparatus would be the more student ego involved manner in which the student creates or constructs his own statement formula by progressively making binary decisions between mutually exclusive pairs of indicia and illuminating the selected indicium. For example, the instructor would illuminate the large "S" and perhaps the indicia "Sg" and "Pl," thereby requiring the student to select either "Sg" (singular number) or "Pl" (plural number). This procedure would be sequentially followed until an entire statement formula has been selected by the student and then this or perhaps another student would be required to construct an English statement compatible with the developed formula. While a theoretically accurate English statement might be constructed for each formula, it will readily appear to the students that some formulas will result which could not be met in native English. As for example, a formula for the "Subject" comprised of Pn-Pl-Cd-3̄-Ph would require pronouns, plural in number, expressed in two or more words, also expressed in the third person, and in phrasal form which would result in the awkward statement "THEY AND THEY. . . ." By thus involving the student in the selection and allowing discovery of inaccuracies and inadequacies, the learning process is fortified.

A third procedural manner for using the teaching apparatus of this invention would be of the deductive or analytical character by the instructors supplying the English statement or sentence and requiring the student to illuminate the appropriate indicia characterizing that statement or sentence. For example, the English statement of "JOHN WENT TO THE STORE" might be supplied and the appropriate response would be: S, (N-Sg-SW) V (Sg-SW-Past) with the student recognizing that the expression "TO THE STORE" is a modifier and, therefore, outside of the basic syntactical structure of English statements and thus is not represented on the instructional panels.

Regardless of which of the three foregoing procedural manners or adaptations thereof that are employed, the instructor would be free to circulate among the students to observe individual responses to the system demands and, therefore, would be able to give immediate assistance in correcting errors. Further, this would permit rapidly moving on to more complex relationships when a given level of student understanding is achieved and observed or to reprogramme for review and emphasis when a given area of relationship is not completely understood. During instruction, the apparatus constructively focuses attention on the particular basal part, limitation, relationship, characteristic, etc., which is being considered.

The modified instructional panels 114, 115 and 116 of FIGURE 3 also relate to teaching English grammar and, in particular, relate to the teaching of immediate constituent structural English grammar as it is well known and defined by those skilled in the contemporary linguistic art. This instructional material may be used in the same three procedural manners as heretofore described or modifications thereof and the more detailed areas of specific instruction that may be accomplished by this subject matter over that presented on instructional panels 14, 15 and 16 will readily appear to those skilled in the art from the very content of these instructional panels 114, 115 and 116. This instructional material symbolically represents and allows construction of the basic word classes of English with the following indicia representing the respective word class: No. 1 equals Noun; No. 2 equals Verb; No. 2L equals Linking Verb; No. 3 equals Adjective; No. 4 equals Adverb; D equals Determiner; No. 2-ing equals Present Participle; No. 2-ed/t/-en equals Past Participle; V equals Intensifier; Aux equals Auxiliary; Aux 2 equals Second Auxiliary; and Infin equals Infinitive. Further, additional instructional material is provided as shown which symbolically represents and allows construction of multiple modified (expanded or reordered) English statements or sentences employing the following structure group concepts as identified by their respective indicia: NCL equals Noun Cluster; VC equals Verb Cluster; S-Group equals Subordinated Group; P-Group equals Preposition Phrase Group; and C equals Conjunction. By employing these indicia there is basic syntactical patterns of English statements or sentences which may be symbolically represented for instructional purposes in any of the heretofore described manners. As with the indicia presented on instructional panels 14, 15 and 16, the indicia representing limitations, relationships, characteristics, etc., of the basic primary divisions is logically grouped around the symbol or indicia representing that primary division.

Referring now more particularly to FIGURE 4, another three instructional panels 214, 215 and 216 are illustrated with the appropriate indicia set forth thereon relating to instructional materials concerned with generative transformational English grammar as such is well known and defined by those skilled in contemporary linguistic studies. The areas of important instructional use of this material will readily appear from a consideration of the limitations, relationships, characteristics, etc., of the indicia set forth on these instructional panels and the respective word classes or structure group concepts as follows: N equals Noun (nominal); Vi equals Verb (ran, looks—intransitive) type; V-b equals Verb (became—subclass); V-t equals Verb (threw—transitive subclass); V-g equals Verb (gave—subclass); V-c equals Verb (Consider—subclass); V-e equals Verb (elect—subclass); be equals Verb, be—subclass); Adj equals Adjective; Adv equals Adverb; have equals Auxiliary; -ing equals Present Participle; -en equals Past Participle; (D) equals Article/Determiner; PN equals Pronoun; Prep equals Preposition; M equals Modal Auxiliary; C equals Conjunction; Pl equals Plurality; Cd equals Compound; NCl equals Noun Cluster; V-C-ing equals Verb Cluster with -ing; V-C-to- equals Verb Cluster with to-; SC equals Subordinate Clause; RC equals Relative Clause; There equals There Transformation; ? equals Question Transformation; IAM equals Introductory Adverbial Modifier; Past equals Past Tense; Fut equals Future Tense; SG equals Singularity; Pl equals plurality; Cd equals Compound; NCl equals Noun Cluster; SC equals Subordinate Clause; RC equals Relative Clause; V-C-to- equals Verb Cluster with to-; and Prep equals Prepositional Phrase.

Referring now more particularly to FIGURE 5, instructional material is presented in the form of symbolic indicia on instructional panels 314, 315 and 316 and such materials relate to the basic elements of English vocabulary formation. Each of the instructional panels relates to a primary division of multi-syllabic English vocabulary. The initial panel 314 relates to intentional prefixes which indicate the intentional limitations by the speaker relative to such things as "attitude, degree, time, number, orientation, etc.," and the indicium "I" is centrally located on the panel for symbolically representing this initial function. The middle panel 115 relates to the experience matrix roots and/or stems which represent the myriad of daily experiences in such discrete categories as, for example, abstract, concrete, state, action, literal, metamorphoic, etc., and a large "M" indicium is centrally located for representing this medial function. The last panel 316 relates to grammatical suffixes which designate limitations common to English vocabulary such as "agent, state, quality, manner, action, comparison, number, tense, etc.," and a large "F" indicium is centrally located for indicating this final function. The major inflectional limitations, relatonships, characteristics, etc. concerning each of the three primary divisions are appropriately represented by surrounding the identifying indicium of that primary division as shown in the drawing and have the following meanings: Neg equals Negation; Rep equals Repetition; Ord equals Ordination; Dir equals Direction; At equals Attitude; Degr equals Degree; Time equals Time; Numb equals Number; Abst equals Abstract; Concr equals Concrete; State equals State; Act equals Action; Gen equals General; Indiv equals Individual; Liter equals Literal; Meta equals Metaphoric; Plant equals Plant; Anim equals Animal; Miner equals Mineral; V-T equals Vowel/Time; Noun equals Noun (agent, state); Verb equals Verb (action, state); Adj equals Adjective (quality, state); Adv equals Adverb (manner); SG equals Singular; Pl equals Plural; Compar equals Comparative; Super equals Superlative; Past equals Past; Pres equals Present; Contr equals Contraction; Poss equals Possessive. Through the use of the three procedural manners set forth above, or variations thereof, the generative potential of English vocabulary can be highly emphasized to develop this approach to vocabulary by a student. The above-listed primary divisions and the limitations, relationships, characteristics, etc. thereof will be readily familiar to those skilled in the art and their use in vocabulary instruction will be obvious.

It is to be observed that the indicia on each of the instructional panels 14, 15, 16, 114, 115, 116, 214, 215, 216, 314, 315 and 316 is set forth in a predetermined pattern corresponding to the pattern of the cells 20 whereby each of the individual indicium on each of the panels may be individually illuminated by the appropriate light bulb or bulbs. Further, it is to be recognized that other educational material could be similarly organized and set forth on instructional panels for use with this teaching system apparatus without departing from this invention.

Having fully described my invention it is to be understood that I do not wish to be limited to the details herein set forth or to the details illustrated in the drawings, but my invention is of the full scope of the appended claims.

I claim:

1. In a teaching system apparatus, the combination of: a housing having a front plate means, said plate means being divided into a plurality of contiguous areas, each said area having a centrally located prominent indicium identifying a primary division of sentence relationship, each said area being partially subdivided into a plurality of small areas, each said small area having indicia indicating characteristics of said primary division, certain of said small area indicia being organized into groups to indicate mutually excusive characteristics, first light means for selectively illuminating each said prominent indicium, second light means connected together into groups associated with said small area indicia groups, each group of said second light means comprising means for selectively illuminating one area of a small area indicia group, whereby the primary divisions of a sentence and the mutually exclusive characteristics of each primary division may be illustrated.

2. In a teaching system apparatus, the combination of: a housing having a front plate means, said plate means being divided into a plurality of contiguous areas, each said area having a prominent indicium identifying a primary division of a preselected language relationship, each said area being partially subdivided into a plurality of small areas, each said small area having indicia indicating characteristics of said primary division, certain of said small area indicia being organized into groups to indicate mutually exclusive characteristics, first light means for selectively illuminating each said prominent indicium, second light means connected together into groups associated with said small area indicia groups, each group of said second light means comprising means for selectively illuminating one area of a small area indicia group, whereby the primary divisions of said preselected language relationship and the mutually exclusive characteristics of each primary division may be illustrated.

3. The teaching system apparatus of claim 2 wherein said preselected language relationship is the English syntax and there are four of said contiguous areas representing the four basal parts of the English language syntax of subject, verb, object and complement as the said primary divisions thereof.

4. The teaching system apparatus of claim 3 wherein said front plate means is comprised of three side-by-side panels with the left hand panel comprising a first contiguous area for said subject primary division, the middle panel comprising a second contiguous area for said verb primary division, and the right hand panel comprising respectively third and fourth contiguous areas positioned above and below each other for said object and complement primary divisions.

5. The teaching system apparatus of claim 2 wherein said preselected language relationship is that of immediate-constituent structural English grammar with each of said contiguous areas relating to a basic word class of the English language as one of said primary divisions and said small areas of each primary division representing structure group concepts therewithin.

6. The teaching system apparatus of claim 2 wherein said preselected language relationship is that of generative transformational English grammar with each said contiguous area relating to a basic word class as a primary division and the smaller areas thereof relating to structure group concepts therewithin.

7. The teaching system apparatus of claim 2 wherein said preselected language relationship is that of multi-syllabic English vocabulary with a first contiguous area relating to a primary division of intentional speaker limitations, a second contiguous area relating to a primary division of matrix roots and stems, a third contiguous area relating to a primary division of suffix limitations.

References Cited by the Examiner

UNITED STATES PATENTS

| 450,615 | 4/1891 | Delaney | 35—1 X |
| 1,211,115 | 1/1917 | Dye et al. | 40—132 |
| 1,655,294 | 3/1928 | Robinson | 40—130 X |
| 2,900,741 | 8/1959 | McIver | 35—35 |
| 3,179,777 | 4/1965 | Rohacs | 200—167 |

FOREIGN PATENTS

| 145,409 | 4/1936 | Austria. |
| 397,163 | 2/1909 | France. |

EUGENE R. CAPOZIO, *Primary Examiner.*

W. GRIEB, *Examiner.*